United States Patent [19]
Kitai

[11] 3,722,391
[45] Mar. 27, 1973

[54] ACTUATING MECHANISM FOR AN ELECTRICALLY CONTROLLED SHUTTER

[75] Inventor: Kiyoshi Kitai, Tokyo, Japan

[73] Assignee: Kabushiki Kaisha Hattori Tokeiten, Tokyo, Japan

[22] Filed: Apr. 30, 1971

[21] Appl. No.: 139,128

[30] Foreign Application Priority Data

May 1, 1970 Japan..............................45/36855

[52] U.S. Cl....................95/53 EB, 95/10 CT, 95/59, 95/62
[51] Int. Cl..........G03b 7/08, G03b 9/08, G03b 9/58
[58] Field of Search........95/53 EB, 58, 59, 62, 10 C, 95/10 CT

[56] References Cited

UNITED STATES PATENTS

| | | | |
|---|---|---|---|
| 3,584,561 | 6/1971 | Starp | 95/53 EB |
| 3,559,547 | 2/1971 | Rentschler | 95/53 EB |
| 3,525,294 | 8/1970 | Rentschler | 95/53 EB |
| 3,502,011 | 3/1970 | Rentschler et al. | 95/10 CT |
| 3,507,201 | 4/1970 | Fahlenberg et al. | 95/53 EB |

Primary Examiner—Joseph F. Peters, Jr.
Attorney—Robert E. Burns and Emmanuel J. Lobato

[57] ABSTRACT

A camera and shutter in which the shutter exposure time is controlled by a control circuit and the shutter blades are actuated to an open position from a closed position back to the closed position by a mechanism actuated in one direction of movement. The mechanism is reversed in direction only when the shutter is cocked. Two springs cooperate in controlling the movement of a driving plate in one direction. One spring rotates the plate and the other rotates an intermediate control member that stops the driving plate in a shutter-opening position and then is released by the time delay control circuitry of the control circuit so that it allows the driving plate to move under control of its spring in the same direction in closing the shutter that it travelled in opening the shutter.

5 Claims, 6 Drawing Figures

ACTUATING MECHANISM FOR AN ELECTRICALLY CONTROLLED SHUTTER

BACKGROUND OF THE INVENTION

This invention relates generally to cameras and more particularly a new and improved shutter.

DESCRIPTION OF PRIOR ART

In hitherto known electric shutters the shutter is operated to an open position and is held in an open position generally by a securing member under control of an electromagnet. The shutters are provided with a timing switch which is actuated at the opening of the shutters to start in operation the charging of a delay capacitor in a delay circuit of an exposure time control circuit. When the voltage charge in the capacitor reaches a trigger level of a switching circuit in the control circuit the shutter is actuated to a closed position by de-energizing the electromagnet so that the stop or securing member releases the shutter so that it can be acted upon and returned to a closed position. This type of shutter is fairly accurate as to control of the exposure time because the control of the magnetization and demagnetization of the electromagnet is accurately carried out.

In those shutters in which the opening and closing of the shutter is operated by rotation of a shutter blade driving member the necessity of driving the driving member in one direction and then rotating it in an opposite direction to close the shutter results in a relatively complicated mechanism. This type of mechanism introduces a lag or inertia delay in that the driving member must perform a reverse movement when it changes its direction from a direction in opening the shutter to an opposite direction in closing the shutter. The member must be brought to a full stop and the inertia of the driving mechanism must be overcome to stop it and then to again start it to move in the opposite direction.

Since in these mechanisms where a reverse rotation takes place the driving member opening the shutter blades is operated by a spring and then held in an open position against this spring the rotation of the driving member in an opposite direction for closing the shutter necessitates overcoming the spring force that biases the driving member in an open direction. The shutter driving mechanism is held by a stop member holding the shutter open. The electromagnet must have the capacity of holding the stop member and the shutter mechanism against the action of the spring that actuates the driving mechanism to a shutter-opening position. Thus upon release of the securing or stop member by the electromagnet for closing the shutter the spring force that operates the driving member to an open position creates a frictional drag to be overcome as well as the inertia of the mechanism so that an exposure error is introduced even though the electric circuitry has developed a very accurate exposure time delay.

SUMMARY OF THE INVENTION

It is a principal object of the present invention to provide a new and improved shutter in which the disadvantages of the known shutters are overcome.

In the camera and shutter in accordance with the invention a plurality of shutter blades open and close the exposure aperture and these are operated to an opening and closing position by a driving member which is driven in the same direction for opening and closing the shutter aperture. Provision is made in the invention for the use of two springs. A first spring drives the driving member to the shutter opening position and actuates it relative to an intermediate member which stops the driving plate in a position in which the shutter is open. The intermediate or control member is held by an electromagnet of an exposure time control circuit during the opening of the shutter blades. When the delay control circuit controlling the exposure time de-energizes the electromagnet the intermediate member is released and a second spring drives it in the same direction in which the driving member was driven. The driving member is then released by the intermediate member driven in the same direction and the driving member is allowed to move in the same direction under control of its spring closing the shutter.

BRIEF DESCRIPTION OF THE DRAWINGS

Other objects and advantages of the camera and shutter in accordance with the invention will appear from the following description of an example of the invention and the novel features will be particularly pointed out in the specification, appended claims and the drawings in which:

DESCRIPTION OF THE PREFERRED EMBODIMENTS

Figure 1:
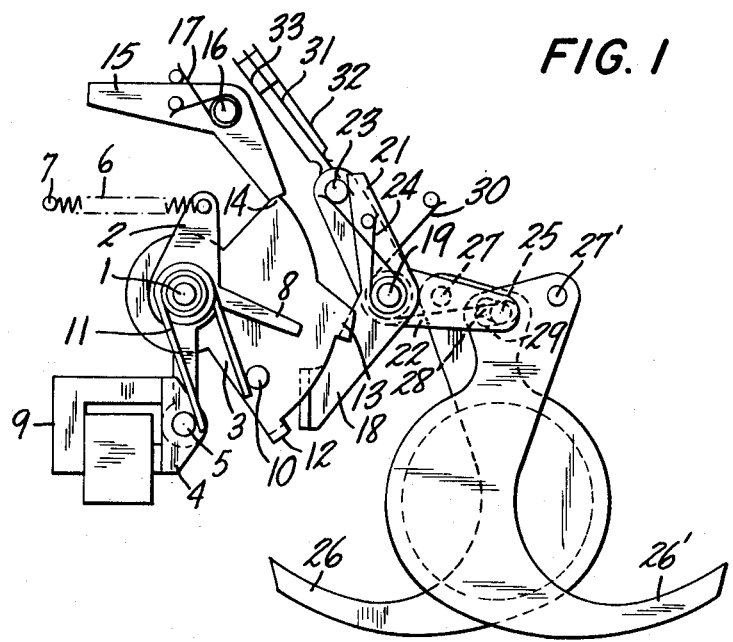
FIG. 1 is a front view of a shutter in accordance with the invention in a cocked condition.

A shaft 1 mounted on a camera body, not shown, rotatably supports a three-arm control lever or intermediate member 2 and a driving member or plate 3. The intermediate lever mounts on a first arm thereof an armature 4 on a pin 5. This intermediate member is biased for rotation in a counter clockwise direction by a spring 6 having one end fixed to a second arm of the lever and an opposite end fixed to a pin 7. A third arm 8 on the control or intermediate member functions as a stop as hereinafter described. In FIG. 1 the shutter is illustrated in a closed and cocked condition in which the armature 4 is attracted and held in the position shown by an electromagnet 9 energized and controlled by an exposure time control circuit hereinafter described. The driving plate 3 is provided with a pin 10 and is biased in a counter clockwise direction by a spring 11 bearing on the two pins 5 and 10.

The driving plate is provided with a projection 12 having a cam part thereof bent upwardly with respect to the plane of the drawing and a second peripheral projection 13 likewise functioning as a cam as hereinafter described. The plate has a notch 14 engaged by an arm of a two-arm locking lever 15 pivotally mounted on a pivot 16 biased by a spring 17 in a clockwise direction into a position in which it abuts and engages the driving plate peripheral notch 14 and holds the driving plate in a cocked position as illustrated in FIG. 1.

An opening two-arm lever 18 is pivotally mounted on a pivot 19 and has a projection 20 which is a bent portion upstanding with respect to the plane of the drawing and is engagable by the driving projection 12 on the driving plate 3. This opening lever has an operating arm 21 cooperating with a shutter blade operating lever 22 pivoted on the same pivot 19 biased by a spring 24 engaged with a pin on the operating lever 18 and an upstanding pin 23 on the shutter blade operating lever. The pin 23 acts as a linking pin biased by the spring 24 into abutment or engagement with the operating arm 21 of the opening lever 18. The shutter blade operating lever is provided with an operating pin 25 for actuating a set of shutter blades 26, 26' pivotally mounted on shafts or pivots 27, 27' respectively. The operating pin 25 is received in slots 28, 29 formed in the two shutter blades 26, 26'. A spring 30 held between the operating pin 25 and a pin on the camera body biases the shutter blade operating lever in a direction for maintaining the blades in a closed position closing the exposure aperture.

A movable contact 31 of a change-over switch, which functions as a timing switch, is engaged by the linking pin 23 on the shutter blade operating lever and is biased by the pin into electrical contact with a fixed contact 32 of the switch. The movable contact is inherently biased for engaging another fixed contact 33 of the change-over switch but is caused to make contact with the first contact 32 because of the engagement with the linking pin 23.

Figure 4:
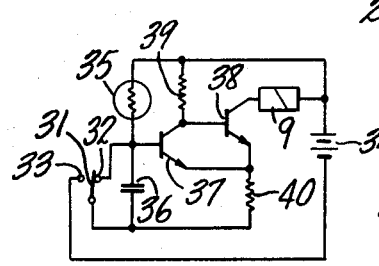
FIG. 4 is a circuit diagram of an electric exposure time control circuit used in conjunction with the shutter in FIG. 1.

An exposure time control circuit controlling the shutter is shown in FIG. 4. As can be seen a power source 34 has connected thereto in a delay circuit a photoelectric element 35, for example a photoconductive cell, in series with a capacitor 36. A junction between the series photoelectric element and capacitor is connected to a base of an input transistor 37 of a trigger or switching circuit having its collector connected to the base of an output transistor 38 of the switching circuit and connected to the positive side of the power source through a resistor 39. The electromagnet 9 is connected to the collector of the output transistor and both transistors have their emitters connected through a resistor 40 to the capacitor 36 and to the movable contact 31 of the change-over switch 31, 32, 33. One of the fixed contacts 32 is connected to the junction before described and the other fixed contact 33 is connected to the negative terminal of the power source.

With the shutter in a cocked state as illustrated in FIG. 1 the camera and shutter therein are in readiness for taking a photographic exposure. When the camera release button or lever, not shown, is depressed to take a photographic exposure the locking lever 15 is actuated thereby and made to rotate counter clockwise against the force of the spring 17 which biases it in a clockwise direction. This rotation disengages the locking lever 15 from the notch 14 of the driving plate so that it is rotated in a counter clockwise direction by the first drive spring 11. As the driving plate rotates its upstanding projection 12 engages the bent portion 20 of the opening lever 18 to make it rotate counter clockwise consequently the operation arm 21 thereof makes the shutter blade operating lever 22 rotate counter clockwise through the linking pin 23 to start the shutter blades 26, 26' to open the shutter. At the same time the movable contact 31 of the change-over switch changes over from the fixed contact 32 to the other contact fixed 33 to establish a charging connection in the delay circuit so that the charging of the capacitor 36 begins. However, since the charging voltage of the capacitor 36 has not yet reached a trigger level of the switching circuit in the control circuit the input transistor 37 on the input side remains in a de-energized state and the output transistor of the switching circuit is in a conductive state so that energizing current is applied to the electromagnet 9 through the change-over switch and the armature 4 of the control or intermediate lever 2 is held attracted by this electromagnet 9 and is kept in its condition as illustrated in FIG. 1.

Figure 3:
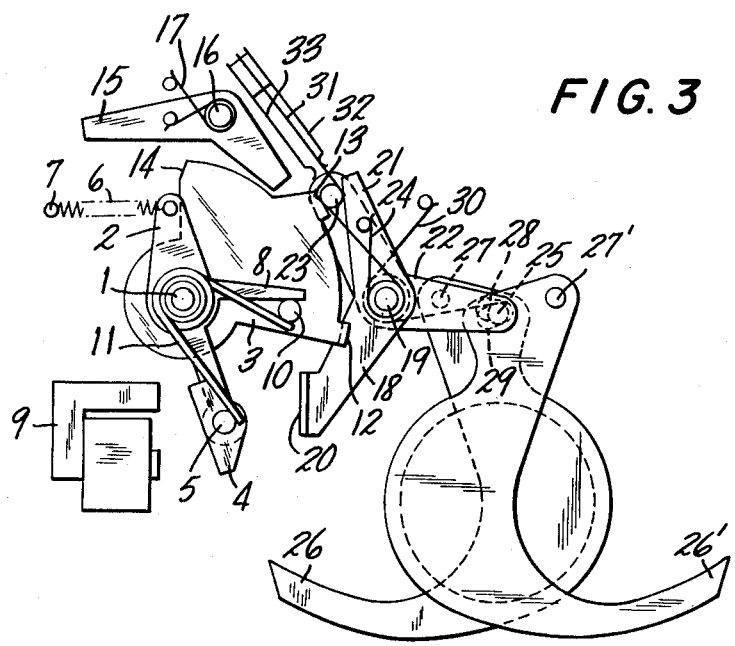
FIG. 3 is a front view of the shutter in FIG. 1 illustrating the shutter after it has completed its closing operation.

The rotating driving plate 3 carries its pin 10 into engagement with the stop or checking arm 8 so that the rotation of the driving plate is stopped in the open state of the shutter. The photoelectric element senses the ambient light in the field being photographed and responds to the brightness of the field or subject being photographed so that the capacitor is charged as a function of the light or brightness thereby establishing a delay time corresponding to the desired exposure time. When the capacitor reaches the trigger level of the switching circuit, comprising the two transistors, both transistors 37, 38 have their states reversed and the energizing current of the electromagnet is interrupted so that the intermediate lever 2 is released by the electromagnet 9 so that the lever begins a counter clockwise rotation under control of the second drive spring 6. At the same time the driving plate 3 starts a counter clockwise rotation again through the action of the first spring 11 and the closing action driving projection 13 has a tapered surface which engages the linking pin 23 making the opening lever 18 and shutter blade operating lever 22 rotate clockwise to make the blades 26, 26' close and stop in the position illustrated in FIG. 3.

Figure 2:
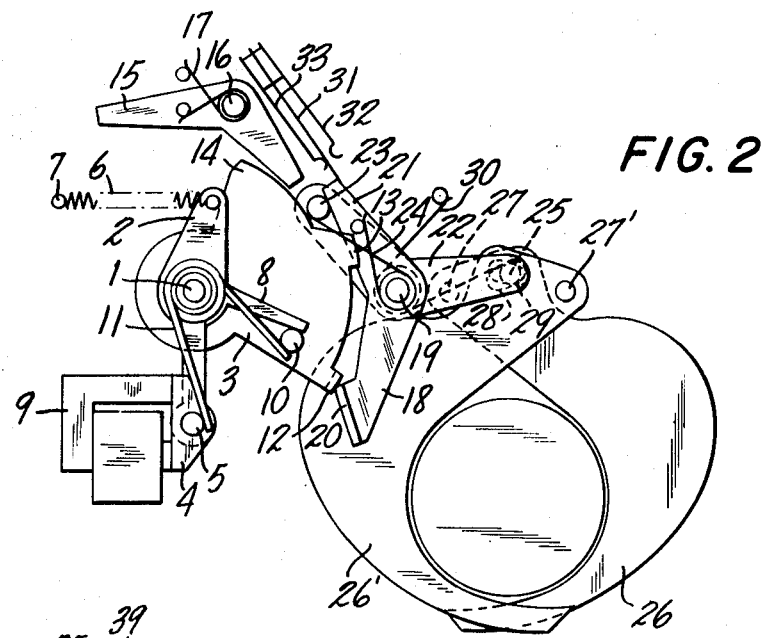
FIG. 2 is a front view of the shutter in FIG. 1 illustrating the shutter in an open condition.

Although in the description of the mode of operation set forth above it is mentioned that the driving plate 3 is stopped in the open state illustrated in FIG. 2 by the stop or checking arm 8. In case of a high-speed exposure it is, of course, possible that the driving plate 3 transfers from the opening mode to the closing mode without stopping once. Because of this possibility of opening and closing the shutter blades, thereby opening and closing the exposure aperture, by driving the driving member in the same direction for both modes it is quite easy and possible for the camera and shutter according to the invention to carry out a very accurately timed high-speed exposure.

Moreover, if in the cocking of the shutter to the state illustrated in FIG. 1 a spring constant of the first spring 11 is selected such that the stored force of the first spring 11 is larger than that of the second spring 6 since the clockwise rotation force applied to the control lever 2 due to the force of the first spring 11 becomes or is larger than the counter clockwise rotation force due to the second spring 6, the armature 4 is accordingly applied to the electromagnet 9 by a force corresponding to the difference between the two rotational forces, mentioned above, when the shutter is cocked. In such a case there is no need of separately providing a part applying the armature to the electromagnet. This is another principal construction feature of the invention in obtaining a simplified shutter construction compared to conventional shutters.

Figure 5:
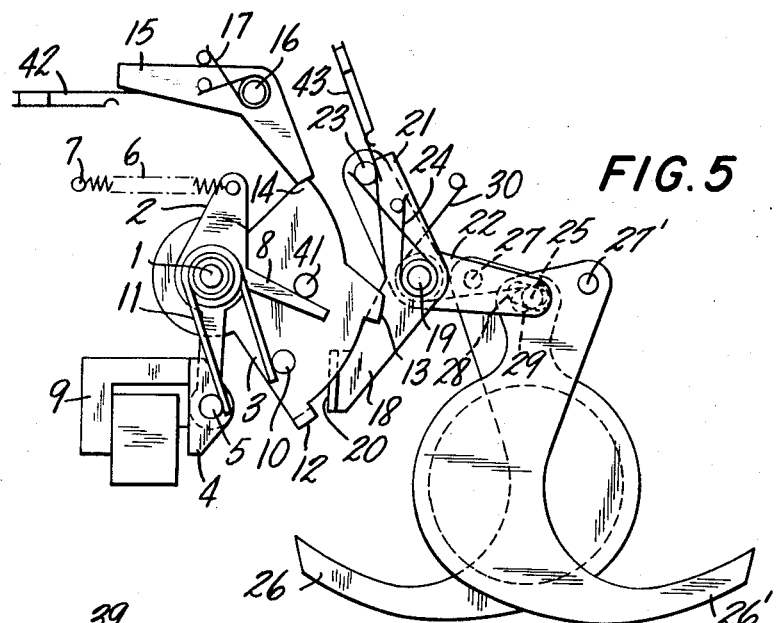
FIG. 5 is a front view of another embodiment of a shutter according to the invention illustrating the shutter in the cocked state.
Figure 6:
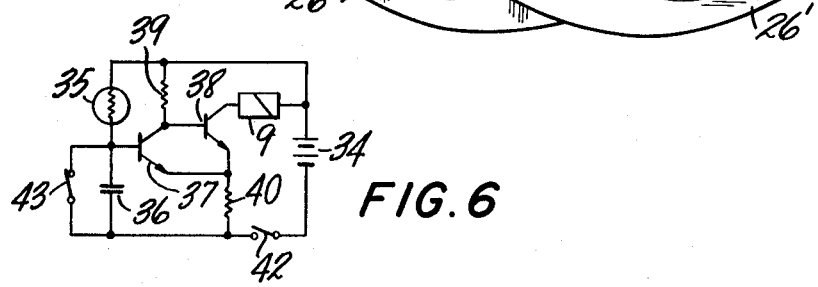
FIG. 6 is a circuit diagram of an electric exposure time control circuit used in conjunction with the shutter illustrated in FIG. 5.

If in the event in the cocking of the shutter the stored force of the first spring 11 cannot be definitely larger than that of the second spring 6 or sufficiently larger it may be sufficient to construct an embodiment type shown in FIGS. 5 and 6. In FIGS. 5 and 6 the elements corresponding to the elements of the prior described embodiment bear the same reference numerals. In this embodiment a connecting pin 41 on the driving plate 3, shown in the cocked position of the shutter in FIG. 5, applies a counter clockwise force to the driving plate 3. Thus if the driving plate 3 is rotated clockwise during the charging of the shutter, by charging means not shown, the connecting pin will engage the stop or checking arm 8 of the intermediate lever 2 during its course of rotation to make the intermediate lever rotate clockwise against the action of the second spring 6 to place the armature 4 into contact, under pressure, with the electromagnet 9 perfectly and the electromagnet 9 will hold the armature more securly during the opening of the shutter.

The second embodiment of the shutter according to the invention illustrated in FIG. 5 has an electric control circuit connected thereto as shown in FIG. 6. This circuit is very similar to the circuit in FIG. 4 and the corresponding elements in the two circuits have the same reference numerals for ease of comparison of construction and mode of operation.

In the embodiment illustrated in FIG. 6 the change-over switch 31, 32, 33 is replaced by a normally open power switch 42 and a timing switch 43 normally closed. As can be seen from the construction in FIG. 5 the power switch 42 is first closed by the rotation of the locking lever 15 then the timing switch 43 is opened by rotation of the opening lever 18 to carry out a mode of operation of the type before described. It is possible to use the control circuit of FIG. 6 with the shutter illustrated in FIG. 1 by changing the switch arrangement therein and it is likewise possible to use the electric control circuit shown in FIG. 4 in conjunction with the shutter illustrated in the second embodiment in FIG. 5.

Each of the control circuits has its own advantages and disadvantages. In the control circuit illustrated in FIG. 4 after the opening lever 18 begins to rotate at the start of motion of the driving plate 3 the movable contact of the change-over switch changes over to the side of the fixed contact 33 so that the electromagnet is energized to hold the armature 4 in the attracted position so that if a spring force of the first spring is weak and the force applied to the armature 4 by the electromagnet is not strong enough there would be a danger of causing the holding action of the control lever 2 to become unstable during the time for effecting the change-over mentioned above. But if the spring force of the first spring is made sufficiently large and the force applied to the armature and the attraction of the electromagnet is sufficiently applied to the initial period of the opening travel of the opening or driving plate the mode of operation is accurate even though the releasing or opening operation is stopped after the change-over switch has been changed over to close the circuit through the fixed contact 33. The shutter action will be performed exactly as desired enabling a long time exposure to occur accurately controlled.

In the circuit illustrated in FIG. 6 the electromagnet 9 is energized before the driving plate starts to move and the armature is securely held but since the electromagnet is de-energized when the power switch 42 is opened it is necessary in case of a long time exposure to maintain the locking lever 15 in its counter clockwise rotation position during the shutter operation.

Since this invention is provided with the above described construction and operation in case the driving member or plate is made to stop once in the opening mode or operation it is possible to lessen the impulse force applied to the intermediate lever so the capacity and size of the electromagnet can be reduced thereby increasing the life of the batteries used as the electric source. At the same time in case of high-speed exposures the exposure time can be extremely shortened because of not having to make the driving part stop temporarily. Moreover, since a securing part is not used in the case where the driving member is stopped once at the open position an exposure error will not ensue. In addition the force of the spring 11 is applied to the control lever 2 additive to the attractive force of the electromagnet so that there is no need of providing a separate mechanism applying a force to the armature in the direction of the electromagnet.

What I claim and desire to Secure by Letters Patent is:

1. In a camera having an electric shutter, in combination, a plurality of shutter blades opening and closing an exposure aperture, means operable in one direction only for actuating said shutter blades from an aperture-closing position to an open position opening the aperture and back to an aperture-closing position comprising a driving member, means operably connecting said driving member to said shutter blades, a spring biasing said driving member in one direction, means releasably holding the driving member in a start position in which said blades are in an aperture-closing position, control means selectively temporarily stopping the driving member in its travel in said direction when the shutter exposure aperture is opened, a spring biasing said control means in a direction for releasing the driving member, time-exposure control means releasably holding the control means, means cooperating with said control means and the first-mentioned spring to allow the first-mentioned spring to actuate said driving member in the same said direction for actuating the shutter blades to an aperture-closing position when said control member is released, said control means comprising a pivotably mounted multi-arm lever, an armature on an arm of said lever, said time-exposure control means comprising an electromagnet releasably attracting said armature driving a period when said aperture is open for taking an exposure, said spring biasing the driving member biasing the armature in the direction of said electromagnet.

2. In a shutter, in combination, a plurality of movable shutter blades operable from a closed position to an open position and back to a closed position for opening and closing an exposure aperture, driving means driven in one direction for operating said shutter blades to said position and back to said closed position, electromagnetic means, a time delay circuit controlling said electro-magnetic means, movably mounted intermediate means releasably controlled by said electromagnetic means and releasably held thereby when said shutter blades are in a cocked condition, said intermediate means having means engageable by said driving means during a driving operation for at times temporarily delaying said driving means in dependence upon the time of release of said intermediate means under control of said time delay circuit, first spring means connected with said driving means and said intermediate means to maintain them unengaged and biasing said driving means in said one direction, second spring means connected with said intermediate means biasing the intermediate means in said one direction that said driving means operates to open and close said shutter blades and driving it in said one direction when released by said electromagnetic means, and means for causing said electromagnetic means to release said intermediate means at least during driving of said driving means in said one direction.

3. In a shutter according to claim 2, in which said first spring biases said intermediate means in a direction of said electromagnetic means when said shutter blades are in a cocked condition.

4. In a shutter according to claim 2, in which said first spring is disposed to operate said driving means to open the shutter blades and second spring operates said driving means to close the shutter blades in conjunction with said first spring.

5. In a shutter according to claim 2, in which the force of said first spring exceeds the force of said second spring.

* * * * *